United States Patent [19]

Holmberg

[11] 4,442,593
[45] Apr. 17, 1984

[54] ANODE BUTT REMOVER

[75] Inventor: Paul M. Holmberg, Oslo, Norway

[73] Assignee: Årdal og Sunndal Verk a.s., Oslo, Norway

[21] Appl. No.: 411,475

[22] Filed: Aug. 25, 1982

[51] Int. Cl.³ .................. B23P 19/04; C25D 17/04
[52] U.S. Cl. .................................. 29/825; 29/252;
29/426.5; 29/762; 204/297 R
[58] Field of Search ............. 204/245, 243 M, 243 R,
204/244, 246–247, 67, 297 R, 279, 225; 373/94;
29/252, 426.5, 426.1, 825, 762, 239; 225/97, 103

[56] References Cited

U.S. PATENT DOCUMENTS

| | | | |
|---|---|---|---|
| 2,507,003 | 5/1950 | Gagne | 29/252 X |
| 2,672,663 | 5/1954 | Whitehouse et al. | 29/426.5 X |
| 2,897,585 | 8/1959 | Bodewein | 29/426.5 X |
| 3,388,501 | 6/1968 | Puhringer et al. | 29/252 X |
| 4,119,505 | 10/1978 | Baillot et al. | 204/245 X |
| 4,217,197 | 8/1980 | Harder et al. | 204/243 R |
| 4,221,315 | 9/1980 | Latchague | 225/103 X |

FOREIGN PATENT DOCUMENTS

| | | | |
|---|---|---|---|
| 330206 | 4/1972 | U.S.S.R. | 204/243 R |
| 383757 | 8/1973 | U.S.S.R. | 204/245 |
| 554316 | 7/1977 | U.S.S.R. | 204/243 R |
| 687144 | 9/1979 | U.S.S.R. | 204/225 |
| 740867 | 6/1980 | U.S.S.R. | 204/243 R |

Primary Examiner—Donald R. Valentine
Attorney, Agent, or Firm—Wenderoth, Lind & Ponack

[57] ABSTRACT

Anode butts are removed from the studs of anode rods by stripping the butts from the studs in a downward direction by hydraulic cylinders, the counter-forces of such action being taken up by the yoke which carries the studs. The stripping forces are thus absorbed inside the device and not transferred to other parts of the structure. The butts are stripped off the studs with only slight crumbling.

16 Claims, 2 Drawing Figures

ANODE BUTT REMOVER

BACKGROUND AND SUMMARY OF THE INVENTION

This invention relates to a device and method for removing anode butts from anode rods.

The electrolytic reduction of alumina to aluminium takes place in large flat vessels or cells, lined with carbon blocks on the bottom and sides. The carbon blocks in the bottom act as a cathode. The anode consists of carbon bodies, often called anode blocks, fixed to steel rods of various designs. These are called anode rods and are fixed to the live bus over the electrolytic reduction cell by means of clamps or screw fixtures. The anode rods serve a double purpose, i.e., they hold the anode blocks in the required position and conduct the electricity for the electrolytic process from the bus bar to the carbon blocks. The electrolyte consists of molten fluorides to which alumina has been added.

The electrolytic process liberates gases on the underside of the anode blocks, and these are thus oxidized and consumed.

It is thus necessary at intervals of about three weeks to remove the anode blocks and replace them with new ones.

Anode changing is performed by removing the anode rod from the anode bus and taking it away together with the remaining unconsumed carbon, called the anode butt. These remnants must be removed to prepare the rod for the fitting of a new anode block.

The present invention relates to a method and an arrangement for this operation, in the following called an anode butt remover.

The anode blocks are usually in the form of a parallelepiped, the largest face of which lying horizontal and acting as the active electrode surface. In the opposite surface there is a hole for fixing the anode rod. Usually there are two or three such holes in which the so-called studs are cast by means of molten iron, or tamped into position with a special tamping paste.

The studs are in line and are fixed at their upper ends to a steel piece, called a yoke. To this yoke there is welded a vertical aluminium rod which is the anode rod proper.

Methods practised hitherto for removing the butts have involved crushing, breaking or splitting the butts. Pulling the butts off the studs has also been tried, the rod being suspended in a suitable device. This method exposes the entire structure to large forces.

In Swedish patent document for public inspection (utläggningsskrift) No. 384 004 an apparatus is described for stripping anode butts from studs. The butts are pressed down off the studs by haudraulic cylinders acting against clamps, which are clamped onto the extension of the anode rod, i.e., the "anode spade." The hydraulic cylinders for the clamps must act against some fixture which is not a part of the structure and thus must be provided separately.

The present invention aims at pressing the carbon remnants off the studs without these press forces being transferred to structural components other than the rod, and the rod itself is to a large extend protected from such forces.

BRIEF DESCRIPTION OF THE DRAWINGS

The anode butt remover and the method of using the anode butt remover of the present invention will now e described in more detail with reference to the accompanying drawings, wherein.

DETAILED DESCRIPTION OF THE INVENTION

After having been removed from the cell, the anode rods are transported by an overhead conveyer, for example a chain conveyer suspended from a hole 10, up to a cleaning station where the anode rod is unhooked.

Figure 1:
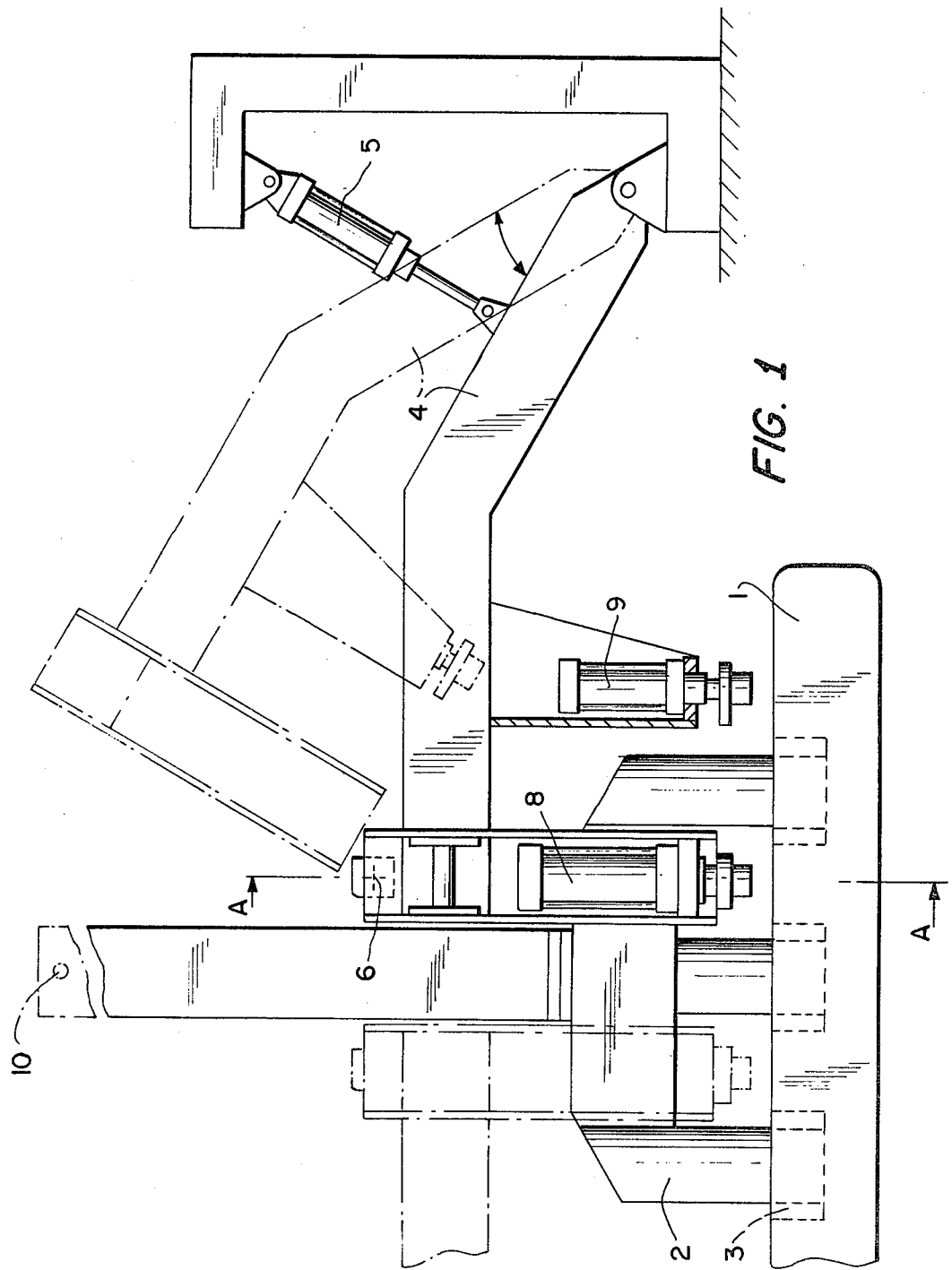
FIG. 1 is an elevation view of an anode butt remover according to the present invention.

When being transported by the conveyor, the anode carbon 1 extends across the direction of travel. On account of this, over each short end there can be swung down an anode butt remover system which is mounted on the end of a boom 4. FIG. 1 illustrates the boom 4 in two positions, the full lines illustrating the lowered, working position, whilst the dot-and-dash lines show the boom 4 in the raised, free position, allowing the anode to pass unimpeded.

A lifting cylinder 5 is used to raise and lower the boom.

Figure 2:
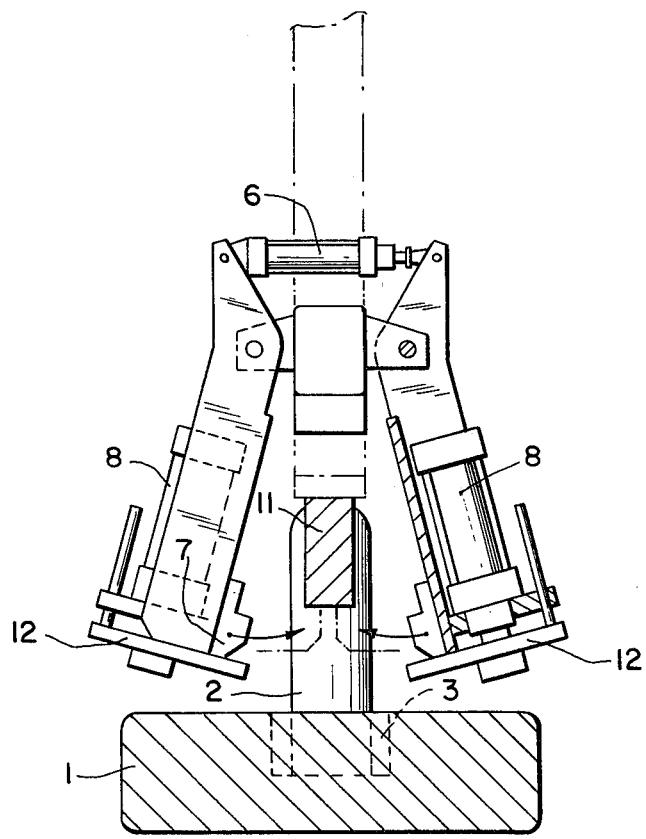
FIG. 2 is a section taken along line A—A of FIG. 1.

In FIG. 2, which is a section through FIG. 1, the boom is in the lowered position thereof and a butt removing arrangement mounted on the boom is in the free position. Two hydraulic piston-cylinders assemblies 8 are pivoted in such a manner that an auxiliary cylinder 6 for this pair can swing the underside of the hydraulic assemblies to or from a working position. In the working position, shown in dashed lines supports 7 of the cylinders of assemblies 8 will hold the yoke 11 of the rods or studs 2, whilst the pistons in the hydraulic assemblies 8 press down on the anode butt closely adjacent to the studs 2 with shoes 12. The shoes are shaped to fit closely around the studs which are fixed by means of cast iron or tamping paste, plus clearance which can be about 20 mm.

Holes 3 are formed in the top of butt 1 for the studs 2, which holes are filled with cast iron or tamping paste.

Each of the two booms 4, only one of which is shown completely, with their butt removing arrangements are mechanically separated, but hydraulically interconnected so as to work synchronously.

It is pointed out that there are, in all, four hydraulic assemblies 8 pressing on the anode carbon 1 between the three studs 2, the counter-force being contained by the yoke 11. These four large assemblies will thus not transmit any forces to the building or foundations.

To remove anode remnants adhering to the outer surfaces of the studs, there are provided two hydraulic cylinders 9 of equal size, one for each end of the anode (only one cylinder 9 being shown in FIG. 1). The opposing forces arising out of the action of these cylinders 9 are compensated for by the hydraulic cylinder 5.

On account of the large surface area exerting pressure on the anode butt, this butt will be forced off the studs without being crushed into small pieces. By shaping the shoes 12 so that they surround, as closely as possible, the studs, a very good cleaning of the studs is achieved. This mechanical cleaning saves labour and is well suited for automation. That the anode remnants are crushed to only a minor extent is advantageous, because this causes little dust in the work place.

I claim:

1. A method for removing an anode butt from anode studs having fixed thereto a yoke, said method comprising:
   providing plural hydraulic piston-cylinder assemblies;
   operating said assemblies in synchronization and exerting a force, parallel to said studs, on the upper surface of said anode butt by said assemblies; and
   exerting the reaction force to said force of said assemblies on said yoke, thereby pushing said anode butt from said studs without the need for absorbing said reaction force in an external structure.

2. A method as claimed in claim 1, wherein each said assembly includes a piston and a cylinder, and pressing one of said piston and cylinder against said upper surface of said anode butt, while pressing the other of said piston and cylinder against said yoke.

3. A method as claimed in claim 2, comprising pressing said pistons against said upper surface of said anode butt, and pressing said cylinders against said yoke.

4. A method as claimed in claim 3, further comprising mounting shoe members on said pistons, and pressing said shoe members against a large area of said upper surface of said anode butt and at positions closely adjacent said studs, thereby removing said anode butt from said studs without substantial crumbling of said anode butt.

5. A method as claimed in claim 3, further comprising providing each said cylinder with a support member, mounting pairs of said assemblies on opposite sides of said yoke for pivotal movement between a working position, whereat said support members are positioned beneath said yoke and said pistons are directed toward said upper surface of said anode butt, and an inoperative position, whereat said support members are pivotted away from said yoke and said pistons are directed away from said upper surface of said anode butt.

6. A method as claimed in claim 5, further comprising mounting each said pair of assemblies on a boom, and selectively pivotting said boom between a working position, whereat said pair of assemblies are positioned at opposite sides of said yoke, and a raised position, whereat said pair of assemblies are above said yoke.

7. A method as claimed in claim 6, comprising providing two said booms, one each at a position adjacent a respective end of said anode butt and an end of said yoke.

8. An apparatus for removing an anode butt from anode studs having fixed thereto a yoke, said apparatus comprising:
   a plurality of hydraulic piston-cylinder assemblies; and
   means for mounting, positioning and synchronously operating said assemblies such as to exert a force, parallel to said studs, on the upper surface of an anode butt, while exerting the reaction force to said force of said assemblies on said yoke, and thereby for pushing said anode butt from said studs without the need for absorbing said reaction force in an external structure.

9. An apparatus as claimed in claim 8, wherein each said assembly includes a piston and a cylinder, and said means comprises means for pressing one of said piston and cylinder against the upper surface of the anode butt and for pressing the other of said piston and cylinder against the yoke.

10. An apparatus as claimed in claim 9, wherein said pressing means comprise means for pressing said pistons against the upper surface of the anode butt and for pressing said cylinders against the yoke.

11. An apparatus as claimed in claim 10, further comprising shoe members mounted on said pistons, said shoe members having a configuration to press against a large area of the upper surface of the anode butt at positions closely adjacent the studs.

12. An apparatus as claimed in claim 10, further comprising a support member extending from each said cylinder, and said mounting and positioning means comprises means for supporting pairs of said assemblies on opposite sides of the yoke, and means for pivotting said pair of assemblies between a working position, whereat said support members are positioned beneath the yoke and said pistons are directed toward the upper surface of the anode butt, and an inoperative position, whereat said support members are pivotted away from the yoke and said pistons are directed away from the upper surface of the anode butt.

13. An apparatus as claimed in claim 12, wherein said pivotting means comprises an auxiliary hydraulic piston-cylinder assembly connected to upper ends of said pairs of assemblies.

14. An apparatus as claimed in claim 12, further comprising a boom supporting each said pair of assemblies, and means for selectively pivotting said boom between a working position, whereat said pair of assemblies are positioned at opposite sides of the yoke, and a raised position, whereat said pair of assemblies are above the yoke.

15. An apparatus as claimed in claim 14, wherein said pivotting means comprises another hydraulic piston-cylinder assembly.

16. An apparatus as claimed in claim 14, comprising two said booms, one each at a position adapted to be adjacent a respective end of the anode butt and an end of the yoke.

* * * * *